US012584535B2

(12) United States Patent
Yilmaz et al.

(10) Patent No.: US 12,584,535 B2
(45) Date of Patent: Mar. 24, 2026

(54) VIBRATION ISOLATION SYSTEM ADJUSTABLE IN THREE AXES

(71) Applicant: BOGAZICI UNIVERSITESI, Istanbul (TR)

(72) Inventors: Cetin Yilmaz, Istanbul (TR); Mehmet Utku Demir, Istanbul (TR)

(73) Assignee: BOGAZICI UNIVERSITESI, Istanbul (TR)

( * ) Notice: Subject to any disclaimer, the term of this patent is extended or adjusted under 35 U.S.C. 154(b) by 0 days.

(21) Appl. No.: 18/691,897

(22) PCT Filed: Sep. 14, 2022

(86) PCT No.: PCT/TR2022/050982
§ 371 (c)(1),
(2) Date: Mar. 14, 2024

(87) PCT Pub. No.: WO2023/043415
PCT Pub. Date: Mar. 23, 2023

(65) Prior Publication Data
US 2024/0352988 A1 Oct. 24, 2024

(30) Foreign Application Priority Data
Sep. 14, 2021 (TR) ................................ 2021/014387

(51) Int. Cl.
*F16F 15/02* (2006.01)
*F16F 15/04* (2006.01)
(52) U.S. Cl.
CPC ............ *F16F 15/022* (2013.01); *F16F 15/04* (2013.01)

(58) Field of Classification Search
CPC combination set(s) only.
See application file for complete search history.

(56) References Cited

U.S. PATENT DOCUMENTS 3,450,379 A * 6/1969 Nolan ........................ F16F 7/14
188/379
3,592,422 A * 7/1971 Paine .................... F16F 15/067
248/589

(Continued)

FOREIGN PATENT DOCUMENTS

CN 102094924 A 6/2011
CN 109058368 A 12/2018

*Primary Examiner* — Monica E Millner
(74) *Attorney, Agent, or Firm* — Bayramoglu Law Offices LLC

(57) ABSTRACT

An isolation system configured to at least partially isolate possible translational vibration in the directions of an X axis and a Y axis and the possible torsional vibration around a Z axis may be experienced by the load by being positioned between a ground and a load. The isolation system includes: a base platform that can be associated with the ground, a carrying platform that can be associated with the load, a tension wire in the center configured to change the natural frequencies of the isolation system by at least partially bringing the base platform and the carrying platform closer together, and a plurality of beams provided with equal distance between them and equal angles with respect to the center around the tension wire, which can be compressed at least partially under force by at least partially bringing the base platform and the carrying platform closer together.

19 Claims, 6 Drawing Sheets

(56)                    References Cited

U.S. PATENT DOCUMENTS

| | | | | |
|---|---|---|---|---|
| 3,794,277 A * | 2/1974 | Smedley | H02B 1/54 | 248/548 |
| 3,972,390 A * | 8/1976 | Melton | B62D 1/192 | 293/133 |
| 5,030,876 A * | 7/1991 | EerNisse | H03H 9/0514 | 310/353 |
| 5,669,594 A * | 9/1997 | Platus | F16F 15/06 | 248/619 |
| 6,371,434 B1 * | 4/2002 | Becker | F16F 15/04 | 267/166.1 |
| 6,648,295 B2 * | 11/2003 | Herren | F16F 15/0275 | 248/562 |
| 6,752,250 B2 * | 6/2004 | Tanner | F16F 15/022 | 188/267.2 |
| 7,325,792 B2 | 2/2008 | Siino et al. | | |
| 7,950,633 B2 * | 5/2011 | Hiley | F16M 11/14 | 188/380 |
| 8,196,910 B2 * | 6/2012 | Baron | F16F 15/04 | 267/136 |
| 8,857,110 B2 * | 10/2014 | Constantinou | F16F 1/121 | 52/167.2 |
| 9,255,399 B2 * | 2/2016 | Ruan | E04H 12/22 | |
| 10,422,397 B1 * | 9/2019 | McKnight | F16F 1/027 | |
| 10,539,204 B2 * | 1/2020 | Arias-Acosta | F16F 15/0235 | |
| 10,655,704 B2 * | 5/2020 | Chang | F16F 15/023 | |
| 12,013,007 B2 * | 6/2024 | Yilmaz | F16F 15/28 | |
| 2004/0212132 A1 | 10/2004 | Tanner | | |
| 2005/0109912 A1 * | 5/2005 | Mulder | F16M 11/125 | 248/564 |
| 2008/0150204 A1 | 6/2008 | klooster et al. | | |
| 2014/0048989 A1 | 2/2014 | Platus et al. | | |
| 2019/0257382 A1 | 8/2019 | Arias-Acosta et al. | | |
| 2025/0060021 A1 * | 2/2025 | Yilmaz | F16F 15/04 | |

* cited by examiner

VIBRATION ISOLATION SYSTEM ADJUSTABLE IN THREE AXES

CROSS REFERENCE TO THE RELATED APPLICATIONS

This application is the national phase entry of International Application No. PCT/TR2022/050982, filed on Sep. 14, 2022, which is based upon and claims priority to Turkish Patent Application No. 2021/014387, filed on Sep. 14, 2021, the entire contents of which are incorporated herein by reference.

TECHNICAL FIELD

The invention is related to at least one isolation system configured to at least partially isolate the translational vibration in the directions of an X axis and a Y axis and the torsional vibration around a Z axis that may excite the load by being positioned between a ground and a load.

BACKGROUND

In the present art, most of the systems with horizontal stiffness adjustment features are either active and require the use of sensors, actuators, control circuits, and electrical power, or although they are passive, they exhibit decreases in isolation performance at low frequencies as a result of friction and backlash that occur during vibrations due to their hinged structures. In the present art, there is no system that can passively and frictionlessly adjust the stiffness of horizontal vibration isolation systems using the tension mechanism according to the mass of the carried load.

It can be seen that passive and frictionless systems, which are few in the literature and have horizontal stiffness adjustment features, have some negative attributes. In such systems, since the torsional natural frequency is higher than the translational natural frequency, it has been determined that the vibration isolation performance of the system at low frequencies is poor in the torsional axis.

Application no. U.S. Pat. No. 7,325,792B2 known in the literature is related to a load isolation assembly. The isolation assembly includes a first mounting plate and a second mounting plate, each parallel to and structurally interconnected with each other. Between the same, it is ensured that the load on the same is isolated. In this assembly, vibration isolation in the horizontal direction is provided by rolling balls. As per the structure of the invention, frequency adjustment cannot be made on the same. The concept referred to as "Wire rope isolator" in the invention involves the use of wires being arranged in an oval shape. However, there is no tension system in this embodiment. Moreover, this assembly is used for vertical isolation.

Application no. CN201811024589 known in the literature is related to an isolation system. The isolation system according to the invention is used in the vibration and stiffness damping process having multiple degrees of freedom. Here, resistance to torsion is present. That means the torsional vibrations are not isolated. Restricting the movement in this direction provides vertical isolation. Horizontal isolation is provided thanks to another part (damping part). That means an element that is similar to buckling is not used. In addition, there is no adjustment feature for horizontal vibration isolation. There is no isolation for torsional vibration either. Moreover, since this invention has a hinged structure, it is not possible to work without backlash.

Application no. US20080150204A1 known in the literature is related to an isolation platform. The isolation platform according to the invention includes supports such as air pistons to dampen the low-frequency vibrations. The isolation platform is equipped with means that limit the pitch and roll motion as the weight distribution changes and the vibration isolation platform exhibits vertical movement. The preferred means for limiting are torsion bars and tensioning means, which transfer force from one part of the platform to another. The main object here is to limit the movement in two different directions of rotation (pitch and roll). There is no torsional vibration isolation function. There are no improvements to the horizontal vibration isolation either. The wires only serve to limit the movement. Other axes are limited for vertical vibration isolation. When the weight balance changes, the wire tension changes as well, and the balance is provided. That is, in this application, the wire tension changes, and the movement in certain directions becomes difficult. Moreover, there is no use of an element that is close to buckling in this application. In this application, wires are used to push a piston, which prevents the system from moving in that direction.

Application no. US20140048989A1 known in the literature is related to an isolation system. In this invention, two or four spring compression mechanisms should be used in a coordinated manner to make the horizontal stiffness adjustment. Stiffness adjustment cannot be made from a single center. In addition, since the horizontal torsional stiffness of the support spring carrying the load is higher than the translational stiffness, it is understood that the isolation performance for the rotational vibrations of the system will be lower than for translational vibrations, especially in cases where lightweight loads are carried. Finally, it was understood that the middle part of the elastic beams was made thick to increase the isolation bandwidth. However, if these parts were made of thin-walled tubes, the radius of inertia of the beams would increase even more and the isolation bandwidth would be increased as well.

As a result, all the above-mentioned problems have made it necessary to make an innovation in the related technical field.

SUMMARY

The present invention is related to an isolation system to eliminate the above-mentioned disadvantages and bring new advantages to the related technical field.

An object of the invention is to present an isolation system used to isolate vibrations arriving at the horizontal (parallel to the ground) direction.

Another object of the invention is to present an isolation system that can isolate vibrations at very low frequencies in three axes even if the mass of the carried load changes.

Another object of the invention is to present an isolation system in which the torsional natural frequency can be adjusted independently of the translational natural frequencies in both directions.

Another object of the invention is to present an isolation system with a wide vibration isolation frequency range.

Another object of the invention is to present an isolation system that operates frictionless (without including hinged structures) when subjected to vibration after manual adjustment.

Another object of the invention is to present an isolation system that can isolate the vibration at very low frequencies in these axes by manually adjusting the stiffness to values close to zero in all three axes at the same time, depending on the mass of the load carried.

To achieve all the objects that are mentioned above and that will come forth from the detailed description below, the invention is at least one isolation system configured to at least partially isolate possible translational vibration in the directions of an X axis and a Y axis and possible torsional vibration around a Z axis that may be experienced by the load by being positioned between a ground and a load. Accordingly, its novelty is characterized in that; to ensure vibration isolation in the horizontal plane at low frequencies even if the weight of the carried load changes, the isolation system includes: at least one base platform that can be associated with the ground, at least one carrying platform that can be associated with the load, at least one tension wire (21) in the center configured to change the natural frequencies of the isolation system (10) by at least partially bringing the said base platform (11) and the said carrying platform (12) closer together, and a plurality of beams (30) provided with equal distance between them and equal angles with respect to the center around the said tension wire (21), which can be compressed at least partially under force by at least partially bringing the base platform (11) and the carrying platform (12) closer together. Thereby, an isolation system is obtained in which horizontal vibrations are isolated even if the weight of the load changes.

A possible embodiment of the invention is characterized in that it includes at least one slide mechanism that enables said beam to move between the base platform and the carrying platform. Thereby, it is possible to move the beams closer to and away from the tension wire in the center.

Another possible embodiment of the invention is characterized in that it includes a channel that can enable the beam to be moved closer to and away from the tension wire in the said slide mechanism to change the torsional natural frequency. Thereby, it is possible to move the beams closer to and away from the tension wire.

Another possible embodiment of the invention is characterized in that it includes at least one tension mechanism that can change the tension of the wire by at least partially pulling and extending the said tensioning wire in the center. Thereby, depending on the need, it is possible to change the tension of the tension wire to make the natural frequency adjustment.

Another possible embodiment of the invention is characterized in that the said tension mechanism is configured to change the tension of the tension wire depending on the load change on the isolation system to change the horizontal stiffness of the beams. Thereby, it is possible to adjust the stiffness of the isolation system to the desired level according to the load change.

Another possible embodiment of the invention is characterized in that it includes at least one tube part and at least one end part associated with the said tube part to enable the beam to be compressed at least partially. Thereby, a balancing beam structure is obtained against the tension wire and the weight of the load. In addition, thanks to the hollow tube, the difference between the natural frequencies of the vibration isolation system is increased, and the isolation bandwidth of the system is increased.

Another possible embodiment of the invention is characterized in that the said beam and slide mechanism are provided in multiple numbers with a predetermined angle between the same with respect to the tension wire. Thereby, balanced load distribution is ensured between the base platform and the carrying platform.

REFERENCE NUMERALS GIVEN IN THE FIGURES

10 Isolation System
11 Base Platform
12 Carrying Platform
20 Tension Mechanism
21 Tension Wire
22 Slide Mechanism 23 Channel
30 Beam
31 Tube
32 End Part
33 Connection Element
(X) X Axis
(Y) Y Axis
(Z) Z Axis

DETAILED DESCRIPTION OF THE EMBODIMENTS

In this detailed description, the subject of the invention is described only for a better understanding of the subject and in the way to create no limiting effect whatsoever.

The invention is related to an isolation system (10). The isolation system (10) according to the invention is used to at least partially isolate horizontal vibrations, that is, parallel to the ground. In the isolation system (10), it is enabled that the translational and torsional natural frequencies (hence the translational and torsional stiffnesses) are adjusted separately. The isolation system (10) can be configured to have adjustable stiffness on the X axis (X), Y axis (Y), and Z axis (Z). The isolation system (10) can preferably be used to protect vibration-sensitive mechanical, optical, and electronic measuring devices used in industrial activities and laboratory studies from vibration.

Figure 1:
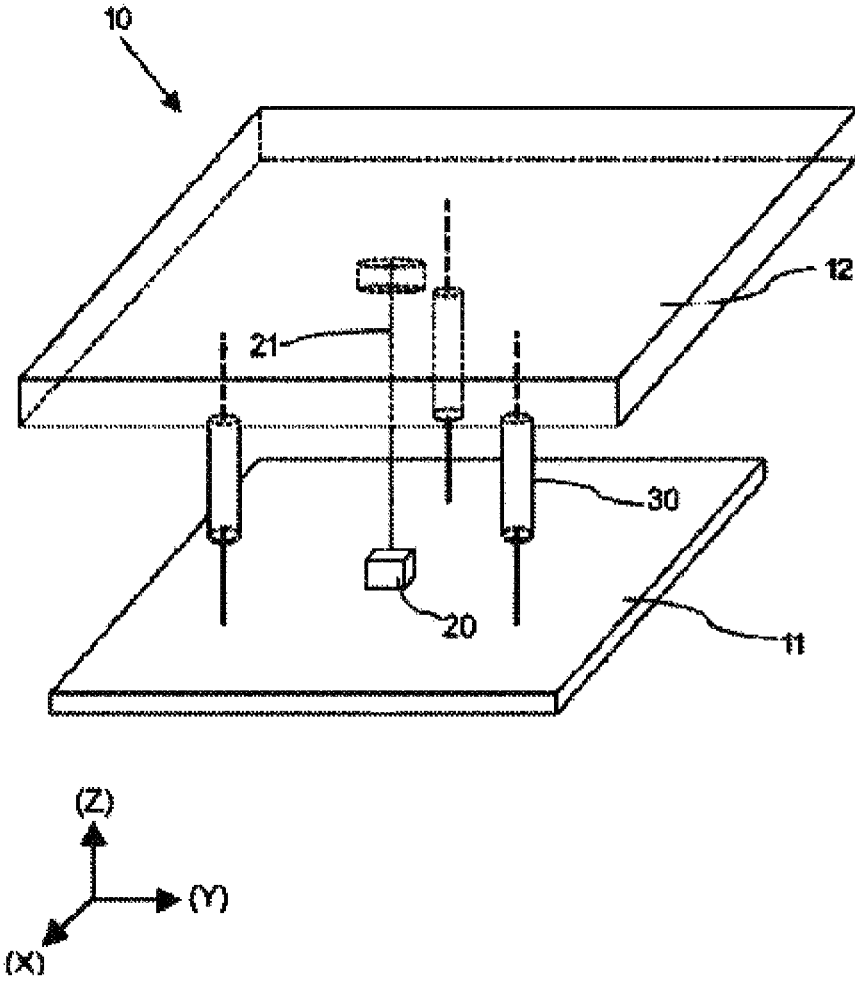
In FIG. 1, a representative schematic view of the isolation system according to the invention is shown.

In FIG. 1, a representative schematic view of the isolation system (10) according to the invention is shown. Accordingly, there is at least one base platform (11) and at least one carrying platform (12) in the isolation system (10). The said base platform (11) and the carrying platform (12) are positioned essentially parallel to each other. The base platform (11) is the part where the isolation system (10) is associated with the ground. The said carrying platform (12) enables the positioning of the load on the isolation system (10). The elements located between the carrying platform (12) and the base platform (11) provide vibration isolation between them. To provide this, at least one beam (30) is positioned between the base platform (11) and the carrying platform (12). The said beam (30) is essentially placed in the direction of gravity and can be an elastically bendable element with variable cross-sections (thin-thick-thin). The beam (30) can be provided in multiple numbers between the base platform (11) and the carrying platform (12) in a possible embodiment of the invention.

There is at least one tension wire (21) at the center of the system between the base platform (11) and the carrying platform (12). The said tension wire (21) can be tensioned between the base platform (11) and the carrying platform (12) by means of at least one tension mechanism (20). The tension mechanism (20) used in the isolation system (10) can be a screw, roller, or gear wheel-containing mechanism. The aim of the tension mechanism (20) is to bring the horizontal natural frequencies of the isolation system (10) closer to zero by changing the wire tension. While a manually adjusted tension mechanism (20) can be used in the isolation system (10), an automatic tension mechanism (20) can also be used. If the tension mechanism (20) is on the base platform (11) as shown in FIG. 1, the tension wire (21) should be fixed in a slot in the upper table. These connections can also be provided in the totally opposite way. If the length of the tension wire (21) is longer than the beams (30), less tension force change is required for stiffness adjustment. To allow this, there is a cavity in the middle of the carrying platform (12) and the upper part of the tension wire (21) can be connected to a higher point compared to the beams (30). In addition, the tension mechanism (20) can be placed under the lower table, and the tension wire (21) can be extended through a hole to be drilled in the center of the base platform (11). When the tension mechanism (20) is on the carrying platform (12), there is also a hole or cavity in the base platform (11), and the tension wire (21) must be fixed by ensuring that it is longer than the beams (30).

The translational ($k_x$, $k_y$) and torsional ($k_{zz}$) stiffnesses of the isolation system (10) can be adjusted by means of the tension wire (21), depending on the axial compressive load applied to the beams (30). The amount of axial compressive load is due to the weights of the carrying platform (12) and the carried load, and the tension force applied by the tension wire (21). The amount of axial compressive load on the beams (30) can be changed by the tension force formed in the wire when the tension wire (21), which is connected to the carrying platform (12) at one end, is pulled a little from the other end. The tension wire (21) is located in the center of the base platform (11) and the carrying platform (12). Beams (30), on the other hand, can be placed around the tension wire (21) in multiple numbers with equal angles and distances between the same. Thereby, it is ensured that the tension force applied from a single point creates an equal compressive force on all beams (30). In the case that three or more beams (30) are used, the load can be carried evenly. When the amount of load carried on the isolation system (10) decreases, the tension force applied by the tension wire (21) can be increased by the tension mechanism, and the horizontal stiffness of the beams (30) can be adjusted to values close to zero. Therefore, the translational ($\omega_x$, $\omega_y$) and torsional ($\langle$ u) natural frequencies of the isolation system (10) are kept at very low values even if the mass of the carried load changes. Since the tensioning amount in the beams (30) and the tension wire (21) should be lower than the yield strength values of the beams (30) and the tension wire (21) as a result of the applied tension force, the tension wire (21) should be longer than the beams (30). In addition, the tension wire (21) can be in the form of single or multi strand steel rope or a solid wire. By using the tensioning method described in the isolation system (10), the stiffness is adjusted manually or automatically in all three axes (translational stiffness in the horizontal X axis (X) and Y axis (Y) and torsional stiffness in the vertical Z axis (Z)) to values close to zero, depending on the load carried. Thereby, even if the mass of the carried load changes, it is ensured that the isolation system (10) performs vibration isolation at very low frequencies in three axes.

Considering that the load carried by the isolation system (10) will have different masses and dimensions and can be placed offset from the center, it is seen that the polar moment of inertia plays an important role in determining the torsional natural frequency, as well as the weight of the load. Therefore, adjusting the torsional natural frequency of the isolation system (10) independently of the translational natural frequencies gives better results in terms of the isolation performance of the system. To achieve this, the torsional stiffness of the isolation system (10) should be adjusted by changing the distances of the beams (30) from the center.

Figure 2:
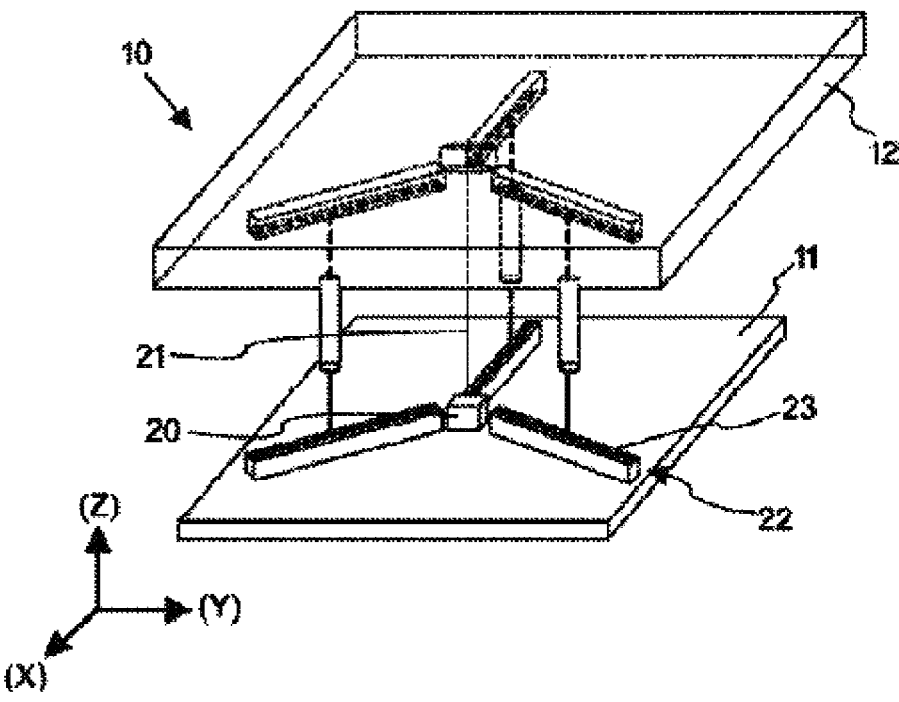
In FIG. 2, a representative schematic view of the position of the slide mechanism in the isolation system according to the invention is shown.

In FIG. 2, a representative schematic view of the position of the slide mechanism (22) in the isolation system (10) according to the invention is shown. Accordingly, there is at least one slide mechanism (22) in the isolation system (10). The said slide mechanism (22) can be mutually provided in multiple numbers on the base platform (11) and the carrying platform (12) with a predetermined angle between them. There are beams (30) between the slide mechanisms (22) positioned opposite each other. There is at least one channel (23) on the slide mechanisms (22) through which the beams (30) can be connected. The said channel (23) allows the beams (30) to be brought closer to and away from the tension wire (21) on the slide mechanism (22). Depending on the load carried, the distances of the beams (30) from the tension wire (21) are changed by sliding the beams (30) within the channels (23). In the case that the number of beams (30) is increased in the isolation system (10), the number of the slide mechanisms (22) can also be increased. The developed slide mechanism (22) adjustment system and the tension mechanism (20) in the middle are used to adjust the torsional natural frequency more precisely.

Figure 3:
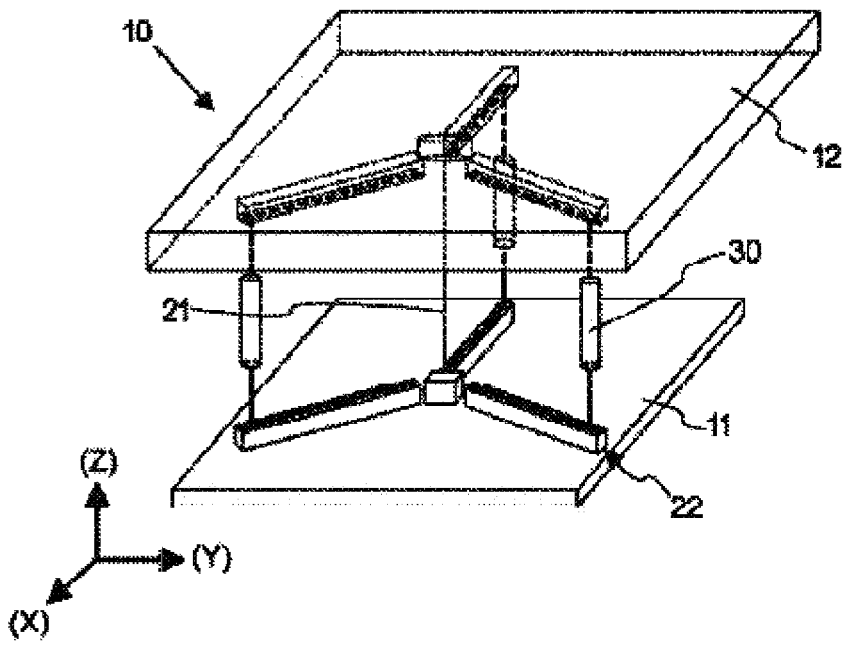
In FIG. 3, a representative schematic view of the beams positioned away from the center in the isolation system according to the invention is shown.

In FIG. 3, a representative schematic view of the beams (30) positioned away from the center in the isolation system (10) according to the invention is shown. In this state, when the axial compressive force on the beams (30) is neglected, the torsional natural frequency of the isolation system (10) increases. However, with the increase of the axial compressive force, the torsional natural frequency decreases more rapidly than in the case in FIG. 2 (where the beams (30) are brought closer to the tension wire). The translational natural frequencies are not affected by these distance changes. Therefore, when the carried load is the same and the tension force is constant, when the distance between the beams (30) is increased, the torsional natural frequency increases while the translational natural frequencies remain the same as in the case in FIG. 2. In the case that these beams (30) are brought closer to the center, the translational natural frequencies remain the same while the torsional natural frequency decreases. Therefore, while the wire tension is constant, the movement of the beams (30) in the channels (23) only changes the torsional natural frequency. The tension of the wire in the middle can be increased or decreased to decrease or increase both natural frequencies.

Figure 4:
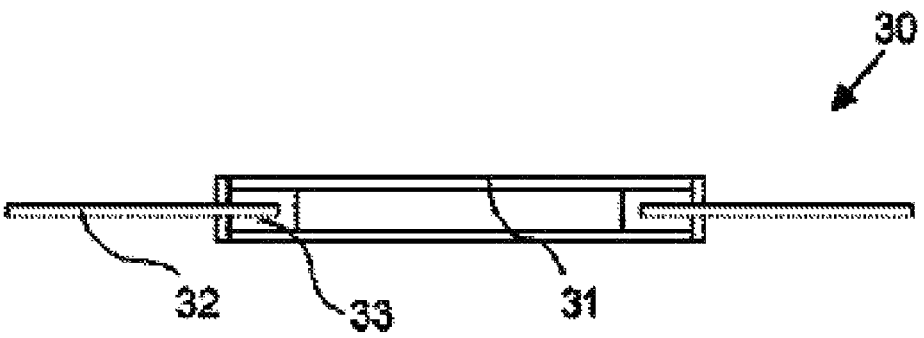
In FIG. 4, a representative schematic view of the beam in the isolation system according to the invention is shown.

In FIG. 4, a representative schematic view of the beam (30) in the isolation system (10) according to the invention is shown. Accordingly, the beams (30) have a unique structure to increase the isolation bandwidth of the isolation system (10). To increase the isolation frequency range of the isolation system (10), the ratio of the first and second bending natural frequencies of the beams (30) must be reduced. To achieve this, the radius of inertia of the middle part of the beams (30) should be high but its mass should be low. Therefore, there is at least one tube (31) part in the middle part of the beams (30). The said tube (31) part has a wide and hollow (thin-walled) structure. There is an end part (32) each on the opposite sides of the tube (31) part. The said end parts (32) are manufactured from at least partially elastic material. There is at least one connection element (33) between the end parts (32) to associate the same with the tube (31) part. The said connection element (33) is essentially connected to the tube (31). While the opposing end parts (32) are tightly inserted into the connection elements (33) with a press or similar equipment, the connection elements (33) are inserted into the tube (31) in the same way. In the alternative embodiments of the invention, these parts can be joined by heating. In addition to this, the joining process can also be performed by methods such as bonding, soldering, brazing, or welding.

For the vibration isolation performance in the translational axes of the isolation system (10) to be the same, the elastic beams (30) with a variable section should be in an axially symmetrical (cylindrical) structure. In this case, the stiffnesses in the X axis (X) and Y axis (Y) are equalized ($k_x = k_y$). In the same way, the natural frequencies on the X axis (X) and Y axis (Y) are equalized ($\omega_x = \omega_y$). The stiffnesses and natural frequencies in these axes can be named as $k_{xy}$ and $\omega_{xy}$, respectively. Because the isolation system (10) will lose its elastic stability in the translational axes first when it carries the maximum amount of load it can, $k_{xy} = 0$ and $\omega_{xy} = 0$. Therefore, there is no need for the tension wire (21) to apply a tension force for this case. However, to reduce $k_{xy}$ and $k_{zz}$, and accordingly $\omega_{xy}$ and $\omega_{zz}$ to very small values when the mass of the load carried is lower, it is necessary to apply a certain amount of tension force (T) to the tension wire (21).

Figure 5:
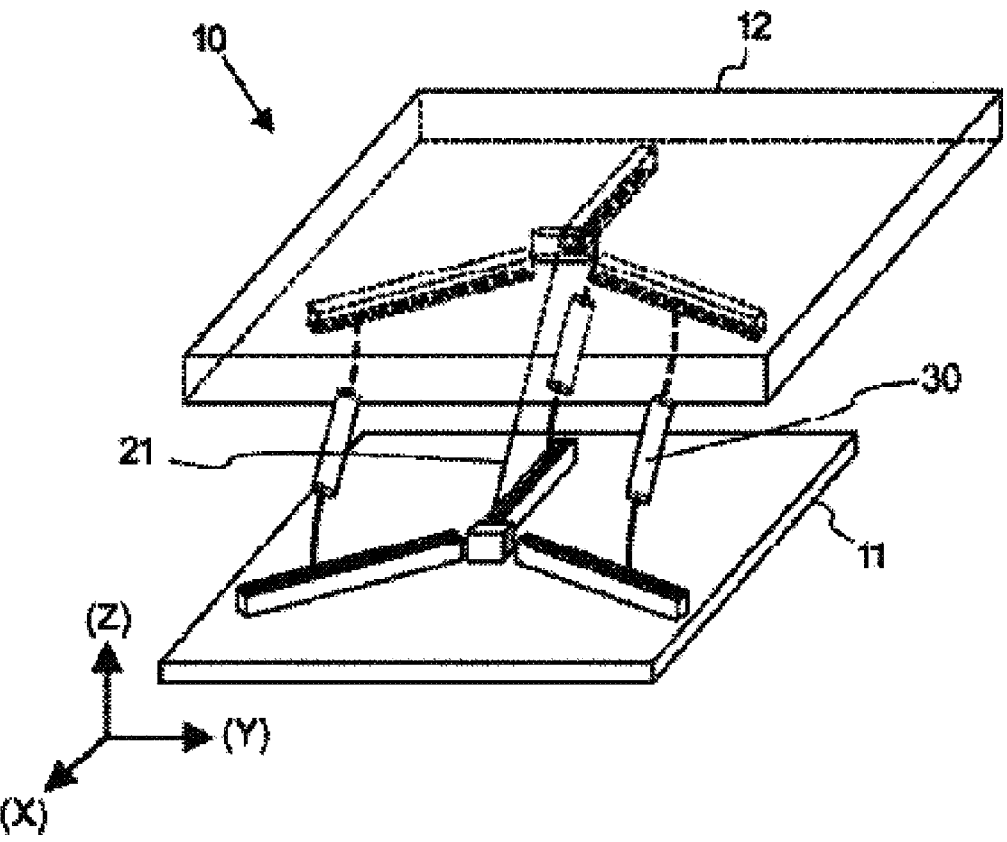
In FIG. 5, a representative schematic view of a partially lateral buckled and bent isolation system according to the invention is shown.
Figure 6:
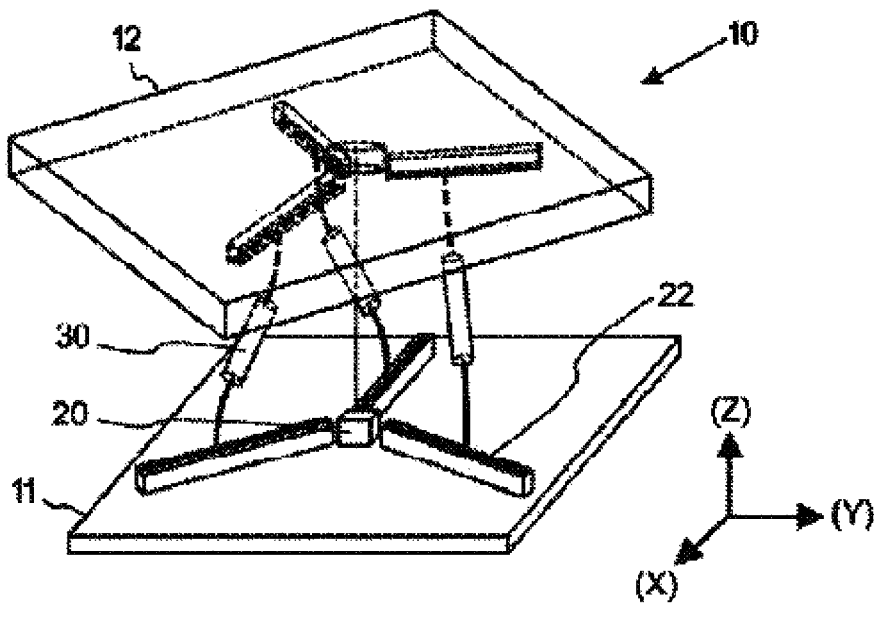
In FIG. 6, a representative schematic view of a partially torsional buckled isolation system according to the invention is shown.

In FIG. 5, a representative schematic view of a partially lateral buckled and bent isolation system (10) according to the invention is shown. In FIG. 6, a representative schematic view of a partially torsional buckled isolation system (10) according to the invention is shown. Accordingly, when the tension force (T) reaches a certain critical value, the isolation system (10) buckles in two different ways as seen in FIG. 5 or FIG. 6, depending on the design parameters and the total weight of the load carried. If the tension force causing lateral buckling and bending of the isolation system (10) as in FIG. 5 is called $T_{cr,xy}$ and the tension force causing it to torsional buckling as in FIG. 6 is called $T_{cr, zz}$, condition $T_{cr, xy} < T_{cr,zz}$ for the first case and condition $T_{cr, zz} < T_{cr, xy}$ for the second case should be met. If $T_{cr, xy}$ is at a much lower value than $T_{cr,zz}$ because the stiffness will first reach zero in the translation axes (X axis (X) and Y axis (Y)), $\omega_{xy} \approx 0$ while $\omega_{zz} > 0$. In this case, the vibration isolation performance of the isolation system (10) is better in the translation axes (X axis (X) and Y axis (Y)). When the opposite situation occurs, the performance of the isolation system (10) in the torsional axis gives a better result. For the isolation system (10) to have a minimized stiffness and minimized natural frequencies in all three axes, $T_{cr, xy}$ and $T_{cr, zz}$ should be close to each other. To achieve this, the torsional stiffness of the isolation system (10) should be changed without changing the translational stiffness. By sliding the elastic beams (30) to different distances by using the slide mechanism (22), the torsional stiffness can be adjusted to the desired values. When this condition is met, $\omega_{xy} \approx \omega_{zz} \approx 0$ in the isolation system (10).

Figure 7:
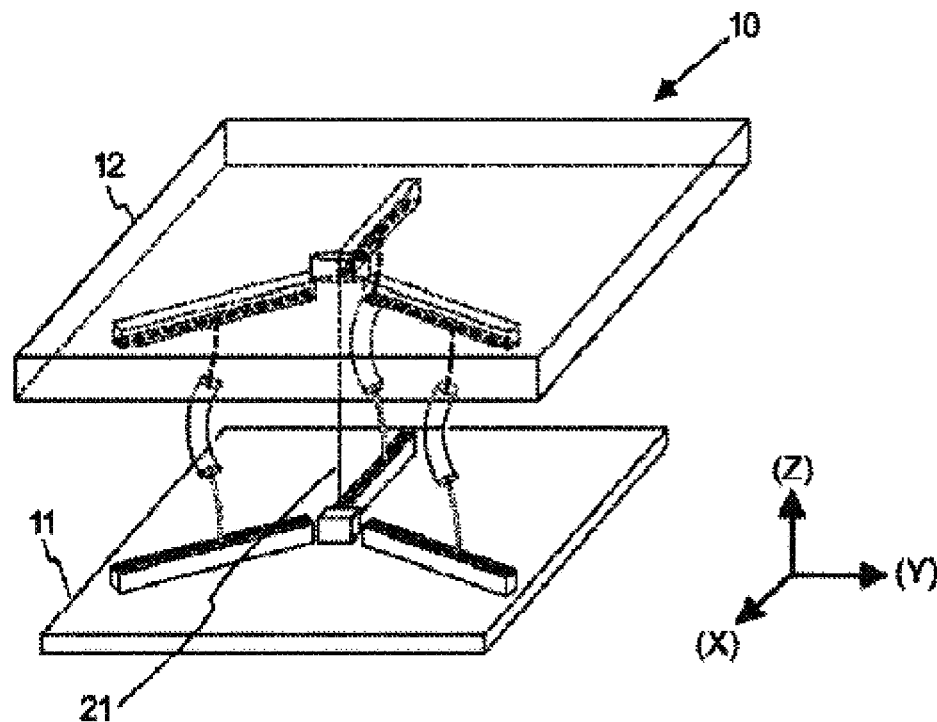
In FIG. 7, a representative schematic view that shows the buckling when tension force that makes $\omega u$ approach to zero, which is the fourth natural frequency of the isolation system according to the invention is shown.

To determine the isolation bandwidth of the isolation system (10), $\omega_u$ which is the fourth natural frequency and is greater than the lowest natural frequencies of the isolation system (10) $\omega_{xy}$ (two values that are equal to each other) and $\omega_{zz}$ should also be determined according to T. In FIG. 7, a representative schematic view that shows the buckling when tension force that makes $\omega_u$ on which is the fourth natural frequency of the isolation system (10) of the invention, zero is shown. If this buckling force is expressed as $T_{cr, u}$, it is obtained that $T_{cr, u} >> T_{cr, xy}$ and $T_{cr, u} >> T_{cr, zz}$. Therefore, when, $\omega_{xy}$ and $\omega_{zz}$ reach very low values, conditions $\omega_u >> \omega_{xy}$ and $\omega_u >> \omega_{zz}$ are met. From this point of view, the isolation bandwidth of the isolation system (10) is determined by the difference of $\omega_{xy} - \omega_u$ or $\omega_{zz} - \omega_u$. To achieve this, elastic beams (30) of variable sections in FIG. 4 are used. Thanks to the thin-walled tube (31) in the middle part, $\omega_u$ frequency can be very high compared to $\omega_{xy}$ and $\omega_{zz}$ frequencies.

Figure 8:
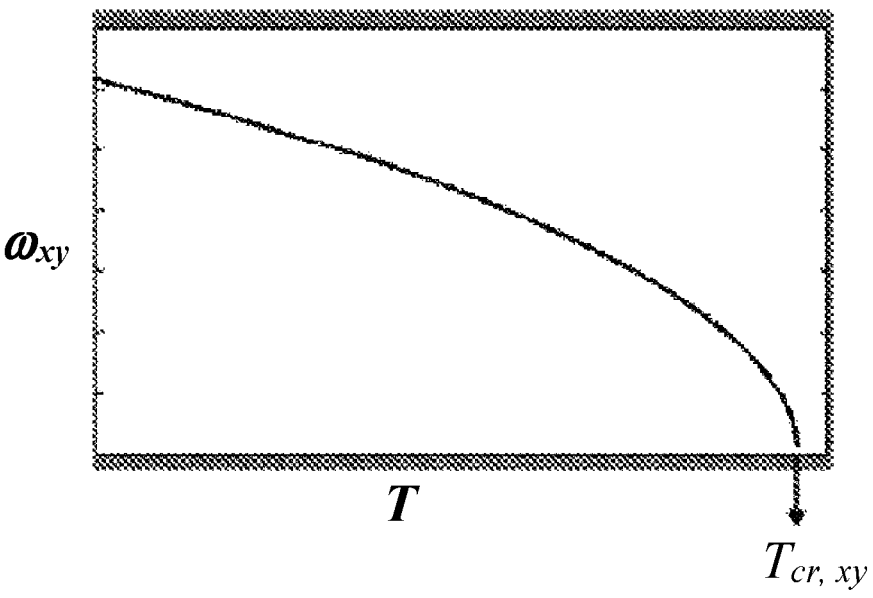
In FIG. 8, a representative graphic view that shows the change of $\omega_{xy}$ according to T tension force in the isolation system according to the invention is shown.
Figure 9:
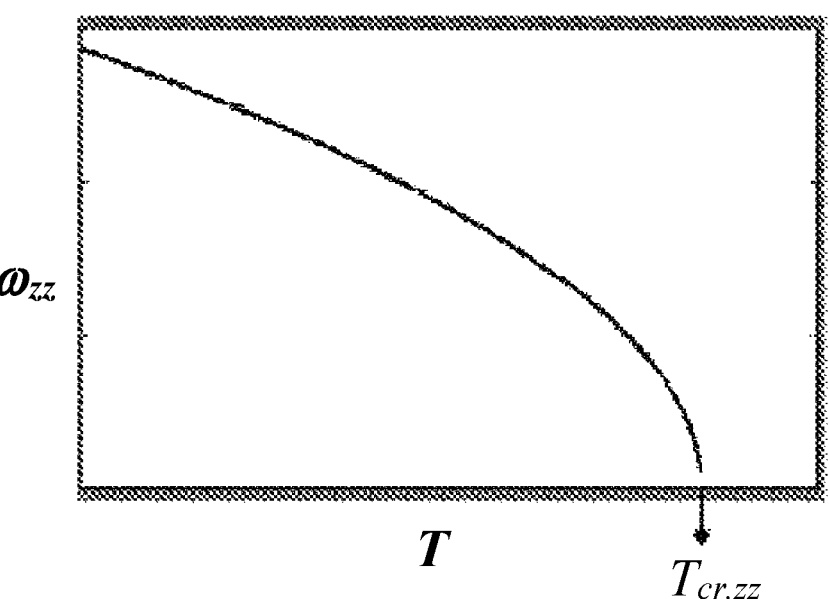
In FIG. 9, a representative graphic view that shows the change of $\omega_{zz}$ according to T tension force in the isolation system according to the invention is shown.
Figure 10:
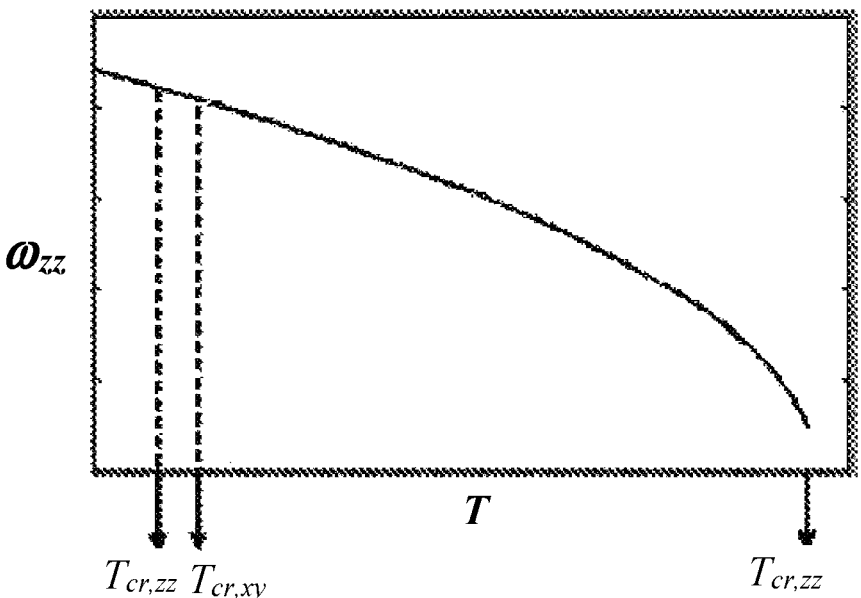
In FIG. 10, a representative graphic view that shows the change of $\omega_u$ according to T tension force in the isolation system according to the invention is shown.

The changes in $\omega_{xy}$, $\omega_{zz}$ and $\omega_u$ with respect to the tension force (T) in FIG. 8, FIG. 9, and FIG. 10 are shown, respectively. As can be seen from all three figures, these natural frequencies decrease towards zero as T approaches $T_{cr,xy}$, $T_{cr,zz}$ and $T_{cr,u}$ respectively. Since it is seen that the condition $T_{cr,zz} < T_{cr,xy} << T_u$ is met in FIG. 10, initially $\omega_{zz}$ approaches zero. As a result, where T is very close to Tcr, zz the condition $\omega_{xy} \approx \omega_{zz} << \omega_u$ is met. On the other hand, $T_{cr,xy}$ and $T_{cr,zz}$ values in FIG. 10 can be brought to the same point by adjusting the slide mechanism (22).

In the proposed invention, it is ensured that the translational and torsional natural frequencies of the isolation system (10) are set to very low values even if the mass of the carried load changes. In addition, thanks to the slide mechanism (22) developed, the torsional natural frequency of the isolation system (10) can be adjusted independently of the translational natural frequencies. By this means, it is ensured that the first three natural frequencies of the isolation system (10) are close to each other. In such systems found in the literature, horizontal stiffness cannot be adjusted with a single mechanism. Since it was discovered that stiffness adjustment mechanisms should be used in a coordinated way to achieve this feature, it is seen that the mechanical structure of the system becomes complex, and accordingly, the production cost of the system increases as the ease of use diminishes with the increase in the number of elements. In the proposed invention, the horizontal stiffness adjustment is made with a compact, cost-effective, and easy-to-use wire tension mechanism (20). Finally, thanks to the uniquely designed elastic beams (30), the isolation bandwidth of the invention can be achieved in much larger frequency ranges than the systems found in the literature.

With all this structure, an isolation system (10) is obtained to isolate the vibrations coming in the horizontal (parallel to the ground) direction. In the designed horizontal vibration isolation system (10), it is possible to adjust the translational and torsional natural frequencies (hence the translational and torsional stiffnesses) separately. By using the tension mechanism (20) developed, the stiffness can be adjusted manually or automatically to a value close to zero in all the three axes at the same time, depending on the load carried. Thanks to this tensioning method developed, it is ensured that the isolation system (10) performs vibration isolation at very low frequencies in three axes, even if the mass of the carried load changes. In addition, thanks to the channel (23) structure developed, the torsional natural frequency of the system can be adjusted independently of the translational natural frequencies. Since the isolation system (10) works without friction, it is possible to obtain vibration isolation in very wide frequency ranges. Thanks to the elastic beams (30) created with a unique design, it is ensured that the isolation system (10) developed has a wider vibration isolation frequency range than the systems found in the literature. In addition, instead of the manual stiffness adjustment system developed, the automatic adjustment system can be used to measure the value of the load with a load cell, and the tension wire (21) can be brought to the desired tension using an actuator. Thereby, an adaptive adjustment system can be achieved as well. In addition, the torsional natural frequency of the isolation system (10) can be adjusted independently of the translational natural frequencies by changing the distance of the beams (30) from the central vertical axis of the isolation system (10) thanks to the developed unique slide mechanism (22).

The protection scope of the invention is given in the attached claims, and it cannot be limited to what has been described as an example in this detailed description under any circumstances. It is understood that a person skilled in the art can put forth similar embodiments in the light of what has been described above, without departing from the main theme of the invention.

The invention claimed is:

1. An isolation system configured to at least partially isolate translational vibrations in directions of an X axis and a Y axis and torsional vibrations around a Z axis, when positioned between a ground and a load; the isolation system comprises:
   a base platform configured to be associated with the ground,
   at least one carrying platform configured to be associated with the load,
   at least one tension wire in a center configured to change one or more natural frequencies of the isolation system by at least partially bringing the base platform and the carrying platform closer together, and a plurality of beams provided with equal distance between them and equal angles with respect to a center around the tension wire, configured to be compressed at least partially under force by at least partially bringing the base platform and the carrying platform closer together.

2. The isolation system according to claim 1, wherein the tension wire passes through respective centers of the base platform and the carrying platform.

3. The isolation system according to claim 1, wherein the beam comprises at least one slide mechanism positioned between at least one of the base platform and the carrying platform.

4. The isolation system according to claim 3, further comprising a channel configured to enable the beam to be moved closer to and away from the tension wire at a center in the slide mechanism to change the torsional natural frequency.

5. The isolation system according to claim 1, further comprising at least one tension mechanism configured to change a tension by pulling and extending the tension wire at least partially.

6. The isolation system according to claim 5, wherein the tension mechanism is configured to change the tension of the tension wire depending on a load change on the isolation system to change a horizontal stiffness of the beams.

7. The isolation system according to claim 1, further comprising at least one tube part and at least one end part associated with the tube part to enable the beam to be compressed at least partially.

8. The isolation system according to claim 7, wherein the tube has a thin-walled structure.

9. The isolation system according to claim 7, wherein the beams have a cylindrical structure.

10. The isolation system according to claim 1, wherein a length of the tension wire is longer than a length of each of the beams.

11. The isolation system according to claim 3, wherein angles between the slide mechanisms are equal.

12. The isolation system according to claim 2, wherein a length of the tension wire is longer than a length of each of the beams.

13. The isolation system according to claim 3, wherein a length of the tension wire is longer than a length of each of the beams.

14. The isolation system according to claim 4, wherein a length of the tension wire is longer than a length of each of the beams.

15. The isolation system according to claim 5, wherein a length of the tension wire is longer than a length of each of the beams.

16. The isolation system according to claim 6, wherein a length of the tension wire is longer than a length of each of the beams.

17. The isolation system according to claim 7, wherein a length of the tension wire is longer than a length of each of the beams.

18. The isolation system according to claim 8, wherein a length of the tension wire is longer than a length of each of the beams.

19. The isolation system according to claim 9, wherein a length of the tension wire is longer than a length of each of the beams.

* * * * *